Nov. 7, 1961 R. M. LEE 3,007,642
DIGIT-SHIFTING MEMORY SYSTEM
Filed Jan. 23, 1958
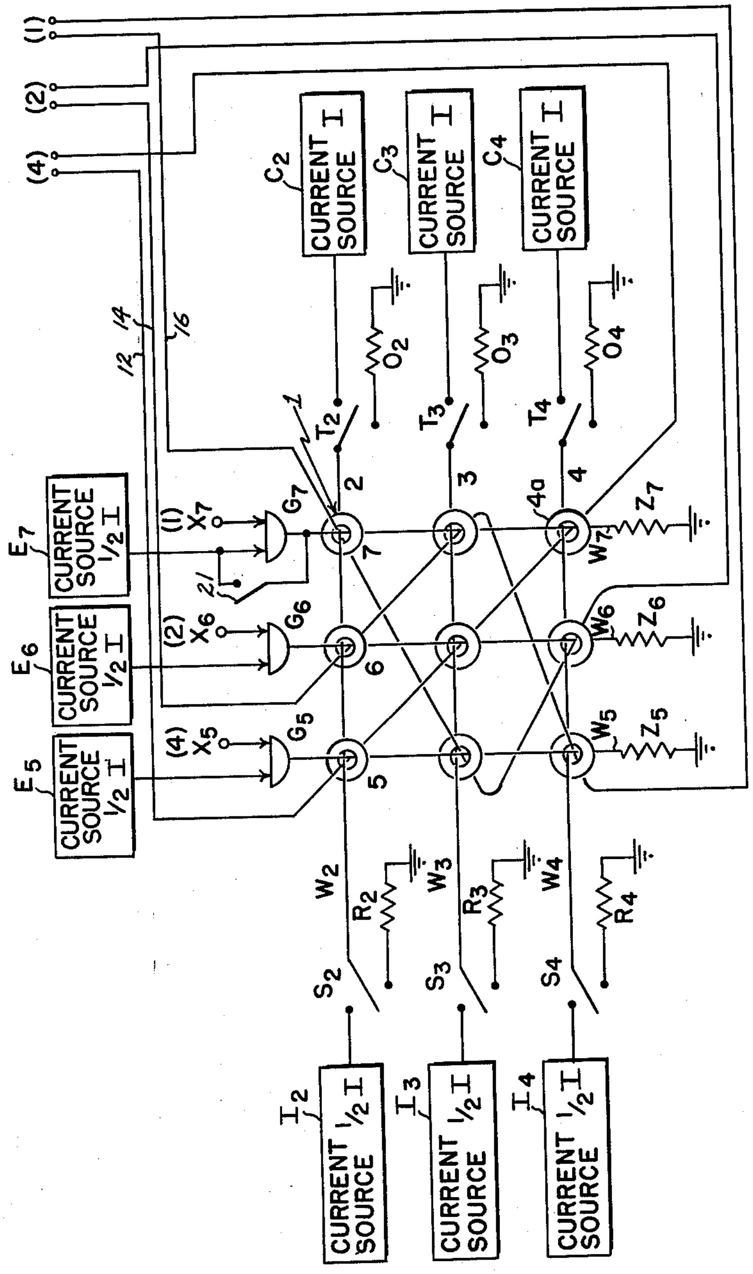
INVENTOR.
ROBERT M. LEE
BY
Byard G. Nilsson
ATTORNEY 3,007,642
Patented Nov. 7, 1961

3,007,642

DIGIT-SHIFTING MEMORY SYSTEM

Robert M. Lee, Los Angeles, Calif., assignor to The Bendix Corporation, a corporation of Delaware Filed Jan. 23, 1958, Ser. No. 710,673
6 Claims. (Cl. 235—164)

The present invention relates to a memory system wherein a predetermined shift may be imparted to the characters, or digits, of a signal-represented numerical value.

In automatic-control systems, computers, and other data-handling systems, digital signals are commonly employed to represent numerical information and other data. Memory systems, or registers, for storing digital signals normally provide an individual storage position for each character, i.e. digit, in the digital numerical value. For example, binary registers for storing binary numbers, normally provide a plurality of two-state storage units to accommodate the digits of the binary numbers. Of course, the number of two-state storage units provided depends upon the number of binary digits in the binary number to be stored. The two-state storage units employed to collectively register a binary number must be arranged in such a manner as to preserve a predetermined time or space relationship between the individual signals representing the digits of the binary number. For example, a three-digit binary number may have digits that are weighted according to decimal values of four, two and one respectively.

Although it is normally desirable in transferring and registering signals representing numbers expressed in digits to maintain a predetermined space or time relationship between the individual signals, the situation often arises when it is desirable to shift the digit-representing signals indicative of a numerical value in such a manner that the characters or digits of the value are moved column-wise either to the right or to the left by a predetermined number of positions. Each position shift in the digits of the number has the effect of multiplying or dividing the number by the base of the notation employed. For example, shifting the digits of a binary number one position to the right has the effect of dividing the binary number by two. It may therefore be seen, that by shifting digits, numerical values may be very rapidly multiplied or divided by the base of the notation employed in representing the numerical value. Furthermore, in programming various systems which employ signals to represent numerical values and other information, it is often desirable to shift the digits of a number within a storage location, for purposes other than to effect a multiplication or a division.

The present invention provides a digital register wherein a predetermined shift may be imparted to the signal-represented digits of a numerical value. A plurality of individual digit-storage units are provided and connected in such a manner as to receive and register the digits of a numerical value. These storage units are then coupled to output circuits in such a manner that a numerical value, upon being sensed from the register, will appear with a predetermined shift imparted to the individual digits.

Various objects and advantages of the present invention will become apparent from the following detailed description when taken in conjunction with the accompanying drawing which is a diagrammatic representation of a system constructed in accordance with the present invention.

In the drawing there are shown a plurality of magnetic cores in a single-plane array 1. The cores in the array 1 are capable of possessing two stable magnetic states, and may thereby register binary digits. Magnetic cores of this type are well-known in the prior art, and are shown and described in United States Patent 2,708,722, issued May 17, 1955, to An Wang, entitled "Pulse Transfer Controlling Devices."

The array 1 includes horizontal rows 2, 3 and 4 and vertical columns 5, 6 and 7. These row and column designations are employed throughout the description as subscripts in conjunction with a letter to identify components associated respectively with a column or a row. The components associated with each row are similar and are connected in the same fashion. To illustrate, these components and their mode of connection, consider row 2, the cores of which are conductively coupled to a conductor $W_2$. One end of the conductor $W_2$ is connected to the movable contact of a switch $S_2$. The upper stationary contact of the switch $S_2$ is connected to a current source $I_2$, while the lower stationary contact to the switch $S_2$ is connected through a resistor $R_2$ to ground. The other end of the conductor $W_2$ is connected to the movable contact of a switch $T_2$ which has a lower stationary contact connected through a resistor $O_2$ to ground potential. The upper stationary contact of the switch $T_2$ is connected to a current source $C_2$.

Just as the circuits coupled to the rows in the array 1 are similar, so are the circuits coupled to the columns in the array. To illustrate these circuits and their connection consider column 5. A current source $E_5$ is connected to a gate circuit $G_5$. The gate circuits in the system are the well-known coincidence or "and" logic gate circuits. One satisfactory form for these gate circuits is shown and described in United States Patent 2,769,971, issued November 6, 1956 to C. J. Bashe, and entitled "Ring Checking Circuit." The gate circuit $G_5$ is also connected to a terminal $X_5$. The output from the gate circuit $G_5$ is to a conductor $W_5$ which is inductively coupled to each of the cores in column 5. The conductor $W_5$ is connected through a resistor $Z_5$ to ground.

The conductors described above which are inductively coupled to the cores in the array 1 are employed to selectively change the state of various cores in the array 1, to either register a particular binary digit, or to sense the state of the cores. In addition to these conductors, three "read" conductors 12, 14 and 16 are interwoven in the array 1. The conductors 12, 14 and 16 are each inductively coupled to three different cores which are in different columns and different rows.

In the operation of the system shown in the drawing, a three-digit numerical value may: (1) be registered and sensed from the register unchanged, or (2) registered and sensed from the register with its digits shifted one position to the right; or (3) registered and sensed from the register with its digits shifted one position to the left. Of course, in accordance with the invention, digit shifting may be performed to any desired extent; however, in the described embodiment the invention is illustrated by shifts of a single digit position.

To consider the operation of the system assume the application of digital signals to the terminals $X_5$, $X_6$, and $X_7$ which are indicative of a numerical value. These numerical signals may for example employ a binary code wherein the two-state signal applied at the terminal $X_5$ is equivalent to decimal four, while the two-state signal applied at the terminal $X_6$ is equivalent to decimal two, and the two-state signal applied at the terminal $X_7$ is equivalent to decimal one.

Assume first that it is desirable to register the signals appearing at the terminals X and to sense these signals in the same order of significance in which they were registered. In this event, the signals are to be registered in the cores of row 2; therefore, the switch $S_2$ is positioned so that the movable contact engages the upper contact and the switch $T_2$ is positioned so that the movable contact engages the lower stationary contact. Placing the switches $S_2$ and $T_2$ in these positions will result in a current from the current source $I_2$ through the conductor $W_2$ which is essentially one-half the magnitude required to cause the magnetic cores in the array 1 to change in state. During the period when such a current is flowing in the conductor $W_2$, the digits of the numerical value to be registered, as indicated by two-state signals in the order of significance shown, are applied to the gate circuits G through the terminals X. Those gate circuits G which receive a two-state signal at a high value (indicating a "one" digit) will be qualified to allow current from the associated current source E to pass through the gate circuit G. After passing through the qualified gate circuit G, current will pass to the selected conductors of the conductors $W_5$, $W_6$, and $W_7$. In this manner, the three digits of the three-digit numerical value applied at the terminals X cause the selective energization of certain conductors of the conductors $W_5$, $W_6$, and $W_7$ in accordance with the numerical value. The current flowing in the selected conductors of the conductors $W_5$, $W_6$, and $W_7$ is of a magnitude as to be essentially one-half the current necessary to effect a change in state of the magnetic cores in the array 1. This current aids the current from the current source $I_2$ and therefore will cause the cores in the row 2 to be set in a predetermined pattern of magnetic states coinciding to the pattern of the two-state signals applied at the terminal X. In this manner, the three-digit numerical value is registered in row 2 of the array 1.

To sense the numerical value registered in the row 2, the switch $S_2$ is positioned so that the movable contact engages the lower stationary contact, and the switch $T_2$ is positioned so that the movable contact engages the upper stationary contact. As a result of these switch positions, a current will flow from the current source $C_2$ through the conductor $W_2$ in a direction opposite to that previously described. The current from the source $C_2$ is of a magnitude sufficient to effect a change in state by the cores in the array 1. Therefore, any of the cores in the row 2 which were previously set in a one-indicating state will now be caused to change in state and thereby induce a voltage in one of the conductors 12, 14 or 16. Of course, such a voltage may be sensed across the terminals of the conductors 12, 14 or 16. Due to the fact that the conductors 12, 14 and 16 are coupled respectively to the cores in columns 5, 6 and 7 in row 2, the voltages appearing at the terminals of these conductors will be representative of the digits of the three-digit numerical value registered in the cores of row 2. Therefore, no shift in the order of significance will be incurred by registering a numerical value in row 2 and sensing the value therefrom.

Consider now the registration of a numerical value in the cores of row 3, and the sensing therefrom, whereby a one-digit shift to the left will be effected.

To effect the registration of a numerical value in row 3 of the array, the movable contact of the switch $S_3$ is moved to dwell upon the upper stationary contact, and the movable contact of the switch $T_3$ is positioned upon the lower stationary contact. As a result, a current will pass through the conductor $W_3$ from the current source $I_3$, which is of a magnitude essentially one-half that required to effect a change in state in the cores. While such a current is flowing in the conductor $W_3$, currents are set up in the conductors $W_5$, $W_6$ and $W_7$, in accordance with the digits of the numerical value to be registered in the cores. These currents in conjunction with the current from the current source $I_3$ cause certain of the cores in row 3 to be placed in a one-indicating state to thereby register the desired numerical value.

In sensing the numerical value registered in row 3, the movable contact of the switch $S_3$ is positioned to dwell upon the lower stationary contact and the movable contact of the switch $T_3$ is positioned to dwell upon the upper stationary contact. As a result, a current will flow from the current source $C_3$, through the conductor $W_3$, and the resistor $R_3$ to ground potential. The magnitude of this current is adequate to change the state of any cores which are in a one-indicating state. Changes in state by such cores induce voltages in the conductors 12, 14 and 16 indicative of the registered signals. However, due to the manner in which the conductors 12, 14 and 16 are coupled to the cores in row 3, a shift of one digit position to the left in the order of significance is effected in the output numerical value.

The registration of a numerical value in row 4 of the array 1 is performed when it is desired to shift the digits in the numerical value to the right. The registration of a numerical value in row 4 is effected in a manner similar to the registration of a value in the other rows, i.e. by placing the movable element of the switch $S_4$ in a raised position, and the movable element of the switch $T_4$ in a lowered position and energizing selected of the conductors $W_5$, $W_6$, and $W_7$. Upon registering the digits of a numerical value in row 4 of the array 1, these digits may be sensed in a shifted state by forming a current in the conductor $W_4$ from the current source $C_4$. This current is of an adequate magnitude to change the state of any of the cores in row 4 which are in a one-indicating state. Changes in state by such cores will cause a voltage to be induced in certain of the conductors 12, 14 or 16 which will appear across the terminals of these conductors to indicate a one digit.

It may therefore be seen, that by storing a numerical value in rows 3 and 4, a one digit shift in the order of significance may be effected. The operation of the system shown in the drawing may be summarized by the table set out below.

| Row | Digits In | | | Digits Out | | |
|---|---|---|---|---|---|---|
| 2 | 4 | 2 | 1 | 4 | 2 | 1 |
| 3 | 4 | 2 | 1 | 2 | 1 | 4 |
| 4 | 4 | 2 | 1 | 1 | 4 | 2 |

By consideration of the above chart, it may be seen that the digits in the numerical value are shifted one position to the left by being registered and removed from row 3 in the array, and similarly are shifted one position to the right upon being registered and removed from row 4 in the array 1. The organization of the system of the described embodiment shown in the FIGURE is such that the digit which would normally be shifted out of the number or lost is carried around and inserted on the other end of the number. In certain situations this mode of operation is desirable; however, in other operations, as in multiplying or dividing, this situation may not be desirable. For example, consider the division of a number by 2 effected by registering the number in row 4 and reading the number therefrom. Consideration of the above chart indicates that a proper division will be effected if the most-significant digit is blocked. That is, during this mode of operation, it is desirable to block the end-around-carry which would normally result in the shifts effected by the described system. In order to block the formation of the one-digit in the most-significant digit position, a switch 21 is provided in shunt with the gate circuit $G_7$. The closure of the switch 21 thus provides a current in the conductor $W_7$. The provision of a current in the conductor $W_7$ is opposed to the current in the conductor $W_4$. Therefore the combined effect of these currents upon the core *4a* in row 4 is not sufficient to cause the core *4a* to change its state. As a result, the most-significant digit in the output numerical value is blocked and no end-around-carry is effected. Of course, similar switching arrangements may be incorporated in the system to block the end-around-carry during shifts to the left.

It may therefore be seen that the present invention may be employed to provide a simple and effective system of shifting the order-significant digits of numerical values in a predetermined fashion.

It should be noted that although the particular embodiment of the invention herein shown and described is fully capable of providing certain advantages, such embodiment is merely illustrative of this invention and therefore modifications and changes may be made thereto without departing from the spirit of the invention or the scope of the following claims.

I claim:

1. A system for imparting a preselected shift in the order of significance of parallel signals representing a numerical word, comprising: a plurality of word registers, each including a multiplicity of storage units; a plurality of order-significant input conductor means for receiving said parallel signals, said input conductor means being coupled to said plurality of registers; first switch control means for selectively registering said parallel signals carried by said conductor means in said storage units of each of said registers; a plurality of order-significant output conductor means to receive said parallel signals from said registers, said output conductor means being coupled to the storage units of each of said registers in an order different from said input conductor means; and second switch control means for applying signals registered in each of said registers to said output conductor means.

2. Apparatus according to claim 1 wherein said storage units comprise magnetic cores for registering binary signals.

3. Apparatus according to claim 1 wherein said plurality of output conductor means is connected to said registers in a relationship with respect to the connection of said input conductor means whereby to vary the arrangement of said parallel signals to effectively multiply said numerical word by various predetermined values.

4. A system for imparting a preselected shift in the order of significance of parallel signals representing a numerical word comprising: a plurality of word registers, each including a multiplicity of magnetic-core devices; a plurality of order-significant input conductors for receiving said parallel signals, said input conductors being coupled to a magnetic-core device in said registers; first switch control means for selectively registering said parallel signals carried by said input conductors in each of said registers; a plurality of order-significant output conductors to receive said parallel signals from said registers, said output conductors being coupled to the magnetic-core devices of each of said registers in an order different from said input conductors; and second switch control means for applying signals registered in each of said registers to said output conductors.

5. An apparatus as described in claim 4, wherein said switch control means each comprise a switching circuit and inductive means for selectively driving the magnetic-core devices in each one of said registers.

6. Apparatus according to claim 4 wherein said first switch control means comprises a switching circuit and inductive means for magnetically driving said magnetic-core devices of a selected register to a level from which said signals in said conductors can alter the magnetic states thereof.

References Cited in the file of this patent

UNITED STATES PATENTS

| | | |
|---|---|---|
| 2,701,095 | Stibitz | Feb. 1, 1955 |
| 2,834,007 | Smith | May 6, 1958 |

Notice of Adverse Decision in Interference

In Interference No. 92,835 involving Patent No. 3,007,642, R. M. Lee, Digit-shifting memory system, final judgment adverse to the patentee was rendered Jan. 22, 1963, as to claims 1, 2, 3, 4, 5 and 6.

[*Official Gazette April 30, 1963.*]